United States Patent [19]

Kersey et al.

[11] Patent Number: 4,907,849
[45] Date of Patent: Mar. 13, 1990

[54] INTEGRATED-OPTIC, POLARIZATION-SELECTIVE PHASE MODULATOR

[75] Inventors: Alan D. Kersey; Catherine Bulmer, both of Springfield; Anthony Dandridge, Alexandria, all of Va.

[73] Assignee: The United States of America as represented by the Secretary of the Navy, Washington, D.C.

[21] Appl. No.: 233,519

[22] Filed: Aug. 18, 1988

[51] Int. Cl.[4] ............................................... G02B 6/10
[52] U.S. Cl. .................................................. 350/96.14
[58] Field of Search ................ 350/96.12, 96.13, 96.14

[56] References Cited

U.S. PATENT DOCUMENTS 4,262,994 4/1981 Sheem .............................. 350/96.14
4,428,644 1/1984 Glass et al. ....................... 350/96.14

Primary Examiner—William L. Sikes
Assistant Examiner—Robert E. Wise
Attorney, Agent, or Firm—Thomas E. McDonnell; George Jameson

[57] ABSTRACT

An integrated-optic, polarization-selective phase modulator is disclosed. In a preferred embodiment of the invention a channel waveguide provides a path therethrough for polarized light having horizontal and vertical polarization components, and an electrode structure is disposed above the channel waveguide and is responsive to the application of a control voltage to the electrode structure for substantially phase modulating only the vertical component of the polarized light.

9 Claims, 1 Drawing Sheet

INTEGRATED-OPTIC, POLARIZATION-SELECTIVE PHASE MODULATOR

BACKGROUND OF THE INVENTION

The present invention relates to integrated-optic modulators and particularly to a polarization-selective integrated optic phase modulator suitable for use in coherent communications, optical signal processing, fiber sensors and waveguide sensor systems.

Typically, integrated-optic waveguide modulators in LiNbO$_3$ substrates exhibit strong polarization dependence. This is primarily due to the strong anisotropy in the material and the resulting difference in electro-optic coefficients for different crystal axis orientations. In general, both the transverse electric (TE) field (or horizontal polarization component) and the transverse magnetic (TM) field (or vertical polarization component) of an input polarized light are phase modulated by the application of an electric field to a channel waveguide in a LiNbO$_3$ substrate. By suitably utilizing a combination of vertical and horizontal electric fields produced by appropriate electrode patterns, as taught in U.S. Pat. No. 4,291,939, it has been shown that the overall TE and TM phase modulation efficiencies can be equalized, thus producing a 'polarization independent' phase modulator. However, to date, no known prior art integrated-optic phase modulator has been developed which can selectively phase modulate only one of the two polarization modes or components of an input polarized light.

OBJECTS OF THE INVENTION

Accordingly, it is an object of the invention to provide a novel type of integrated-optic phase modulator.

Another object of the invention is to provide a polarization-selective, integrated-optic phase modulator suitable for use in coherent communications, optical signal processing, and fiber and waveguide sensor systems.

A further object of the invention is to provide an integrated-optic phase modulator which selectively phase modulates only one of the two polarization components of an input polarized light.

SUMMARY OF THE INVENTION

These and other objects of the invention are achieved by providing an integrated-optic, polarization-selective phase modulator which comprises: a substrate a channel waveguide extending longitudinally along the substrate for providing a path therethrough for input polarized light having horizontal and vertical polarization components; and an electrode structure disposed above the channel waveguide and being responsive to the application of a control voltage to the electrode structure for substantially phase modulating only the vertical polarization component (or TM mode) of the input polarized light.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein.

DETAILED DESCRIPTION OF THE INVENTION

Figure 1:
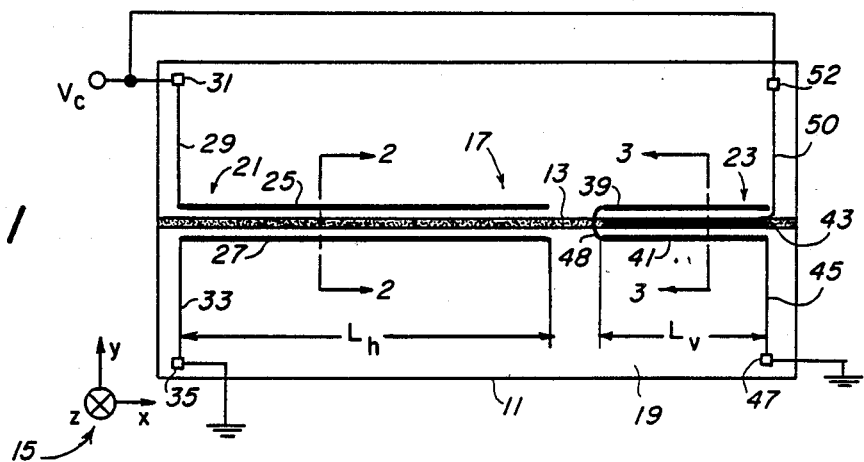
FIG. 1 illustrates a top view of the integrated-optic, polarization-selective phase modulator of the invention.

Referring now to FIG. 1, a schematic diagram of the integrated-optic, polarization-selective phase modulator of the invention is shown. In the implementation of the phase modulator of FIG. 1, a suitable electro-optic substrate, such as lithium niobate (LiNbO$_3$) crystal, is utilized. The LiNbO$_3$ substrate 11 is preferably Z-cut (crystal orientation) for X-directed propagation. Titanium (Ti) is diffused into the Z-cut, X-propagating LiNbO$_3$ substrate 11 by conventional diffusion techniques, such as error function diffusion or Gaussian diffusion, to form a channel waveguide 13 for light to propagate therethrough in the X-direction. The channel waveguide 13 extends longitudinally through the substrate 11 in the X-direction. Note that the X and Z directions, as well as the Y direction, are defined in FIG. 1 by insert 15.

A metallic electrode structure 17 is deposited by conventional techniques, such as chemical vapor deposition, onto the surface 19 of the substrate 11 and above the channel waveguide 13. The electrode structure 17 permits the application of orthogonal electric fields to the channel waveguide 13 to collectively phase modulate only one polarization mode or component of polarized light propagating through the channel waveguide 13, as will be explained later. This electrode structure 17 is comprised of two different sets or configurations of electrodes 21 and 23.

The electrode set 21 includes two electrodes 25 and 27, each of length $L_h$. Electrodes 25 and 27 are respectively disposed on opposite side of a first portion (along the length $L_h$) of channel waveguide 13. A metal strip 29 connects electrode 25 to a terminal 31 which is adapted to receive a control voltage $V_c$. Similarly a metal strip 33 connects electrode 27 to a terminal 35 which is connected to a reference potential, such as ground.

Figure 2:
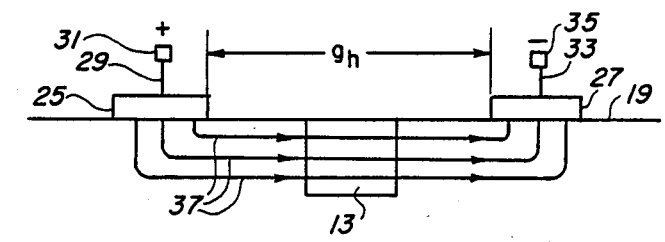
FIGS. 2 and 3 are cross-sectional views of the modulator of FIG. 1 respectively taken along lines 2—2 and 3—3, which views respectively illustrate the electric field orientations along lines 2—2 and 3—3.

Referring temporarily to FIG. 2, a cross-sectional view of the modulator of FIG. 1 taken along line 2—2 of FIG. 1 illustrates the electric field orientations between the electrodes 25 and 27 (of electrode set or configuration 21) when a voltage is applied across the terminals 31 and 35. As clearly shown in FIG. 2, the electrode configuration 21 then allows the application of an electric field in which the principal component (indicated by lines 37) passes through the channel waveguide 13 in a direction parallel to the surface 19 of the substrate 11 and orthogonal to the direction of the channel waveguide 13. In other words, the principal component of the electric field produced by electrode configuration 21 passes through the channel waveguide 13 in the Y-direction, as defined in insert 15 of FIG. 1. Note that, since FIG. 1 is shown in top view, the Y-direction in insert 15 is also the horizontal direction.

Referring back to FIG. 1, the electrode set or configuration 23 includes three electrodes 39, 41 and 43, each of length $L_v$. Electrodes 39 and 41 are respectively disposed on opposite sides of a second portion (along the length $L_v$) of channel waveguide 13, while electrode 43 is disposed over the second portion of the channel waveguide 13. A metal strip 45 connects electrode 41 to a terminal 47 which is connected to a reference or ground potential. The electrode 41 is shown directly connected to the electrode 39 by a metal strip 48 (FIG. 1). As a result, the electrode 39 is also at the same reference or ground potential that the electrode 41 is at. If a direct coupling between the electrodes 39 and 41 is not desired, the electrode 39 can also be connected through a metal strip (not shown) to a terminal (not shown) which is also connected to the same reference or ground potential as the electrodes 27 and 41 are connected to. A further metal strip 50 connects electrode 43 to a terminal 52 which is adapted to receive the control voltage $V_c$.

Figure 3:
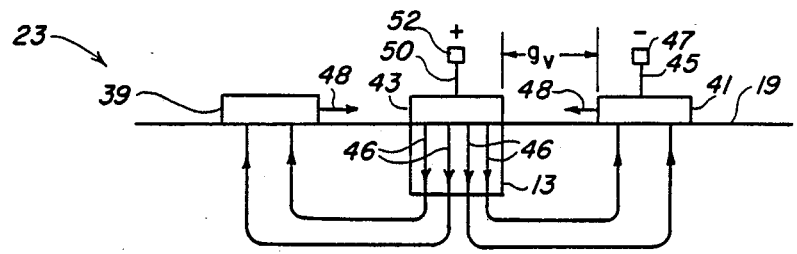

Referring temporarily to FIG. 3, a cross-sectional view of the modulator of FIG. 1 taken along line 3—3 of FIG. 1 illustrates the electric field orientations between the electrode 43 and each of the electrodes 39 and 41 (of electrode set or configuration 23) when a voltage is applied between the electrode 43 and each of the electrodes 39 and 41. As clearly shown in FIG. 3, the electrode configuration 23 then allows the application of an electric field in which the principal component (indicated by lines 46) passes through the channel waveguide 13 in a direction orthogonal to the surface 19 of the substrate 11 and also orthogonal to the direction of the channel waveguide 13. In other words, the principal component of the electric field produced by the electrode configuration 23 passes through the channel waveguide 13 in the Z-direction, as defined in insert 15 of FIG. 1. Note that, since FIG. 1 is shown in top view, the Z-direction in insert 15 is also the vertical direction.

In FIG. 1, note that the electrode 25 in electrode set 21 and the electrode 43 in electrode set 23 are always at the same potential as the control voltage $V_c$, while the electrode 27 in electrode set 21 and the electrodes 39 and 41 are always at the reference or ground potential. As a result, the electrode sets or configurations 21 and 23 will always respectively develop Y (horizontal) and Z (vertical) electric fields in the respective first and second portions of the channel waveguide 13, regardless of the polarity of the control voltage $V_c$ with respect to ground.

The sequence of the electrode configurations 21 and 23 shown in FIG. 1 can be interchanged as long as the relative polarities of the electrodes in the electrode configurations 21 and 23 are maintained.

It should be noted at this time that the gap (or distance) between the electrodes 25 and 27 of the electrode configuration 21 is represented by the term "$g_h$", as shown in FIG. 2. Similarly, the gap (or distance) between the electrode 43 and each of the electrodes 39 and 41 configuration 23 is represented by the term "$g_v$", as shown in FIG. 3.

The phase modulator of FIG. 1 is arranged such that the transverse magnetic (TM) mode (or horizontal polarization component) of an input polarized light is preferentially phase modulated by the application of the control voltage $V_c$ to the electrode structure 17 above the channel waveguide 13. As discussed above, the electrode structure 17 is comprised of the two electrode sets or configurations 21 and 23 which respectively allow horizontal and vertical electric fields to be applied in respective first ($L_h$) and second ($L_v$) portions of the channel waveguide 13, which waveguide 13 is formed by Ti diffusion in the Z-cut, X-propagating LiNbO$_3$ substrate 11. The phase modulator of FIG. 1 utilizes these two electrode sets 21 and 23 to suppress the phase modulation experienced by one polarization mode (the TE mode) as input polarized light passes through the channel waveguide 13.

To more clearly understand these new features of the polarization-selective phase modulator of FIGS. 1, 2 and 3, consider X-directed propagation in the Z-cut LiNbO$_3$ substrate 11 of FIG. 1. For this orientation, the vertically applied electric field $E_z$ (produced by the electrode set 23) causes refractive index changes ($\Delta n$) for both of the TE and TM modes: $\Delta n_{TE} = r_{13}E_z$ and However, the horizontally applied field $E_y$ (produced by the electrode set 21) affects only the TE mode: $\Delta_{TE} = r_{22}E_y$ and $\Delta_{TM} = 0$. The $r_{ij}$ are the electro-optic coefficients for this LiNbO$_3$ crystal orientation and propagation direction.

Therefore, for X-directed propagation of input polarized light through the channel waveguide 13 in the Z-cut LiNbO$_3$ substrate 11 of FIG. 1, an electric field ($E_z$) applied to the waveguide 13 by the electrode set or configuration 23 affects both of the TE and TM modes of that light, whereas the electric field ($E_y$) applied to the waveguide 13 by the electrode set or configuration 21 affects only the TE mode of that light.

For the phase modulator of FIG. 1, the net phase shifts ($\Delta\phi$) experienced by the TE and TM polarization modes of the input polarized light as that light propagates through the channel waveguide 13 are given by:

$$\Delta\phi_{TE} = (K/2) \cdot n_o^3 [\delta_v L_v r_{13} E_z + \delta_h L_h r_{22} E_y] \qquad (1)$$

$$\Delta\phi_{TM} = (K/2) \cdot n_e^3 [\delta_v L_v r_{33} E_z] \qquad (2)$$

where $E_z = V_c/g_v$ and $E_y = -V_c/g_h$, and (as defined before) $g_v$ and $g_h$ are the respective vertical and horizontal electrode gaps shown in FIGS. 2 and 3. The substitution of these values of $E_z$ and $E_y$ in equations (1) and (2) (while ignoring secondary and stray fields) gives:

$$\Delta\phi_{TE} = (K/2) \cdot n_o^3 V_c [\delta_v L_v r_{13}/g_v - \delta_h L_h r_{22}/g_h] \qquad (3)$$

$$\Delta\phi_{TM} = (K/2) \cdot n_e^3 V_c \delta_v L_v r_{33}/g_v] \qquad (4)$$

In the above equations (1) through (4), $n_o$ and $n_e$ are the respective indices of refraction for the TE and TM modes for LiNbO$_3$, $r_{ij}$ (representing $r_{13}$, $r_{22}$ and $r_{33}$) are the relevant electro-optic coefficients for the Z-cut crystal orientation and X-propagation direction of the LiNbO$_3$ substrate 11, $\delta_h$ and $\delta_v$ are the optical/electric field overlap efficiencies associated with the respective electrode sets 21 and 23, and K is the propagation constant in free space.

In order to achieve polarization selective operation, one of the TE and TM polarization modes (of the input polarized light propagating through the channel waveguide 13) must be made insensitive to the applied $E_z$ and $E_y$ electric fields. Clearly, the TE phase modulation can nulled according to the above equations (3) and (4) if:

$$\delta_v L_v r_{13}/g_v = \delta_h L_h r_{22}/g_h. \qquad (5)$$

The phase modulator of FIG. 1 will then preferentially phase modulate the TM polarization mode according to equation (4). Rearranging equation (5) defines the design criteria for this 'polarization selective' mode of operation, where $\Delta\phi_{TE} = 0$ if:

$$(\delta_h/\delta_v) \cdot (L_h/L_v) \cdot (g_v/g_h) = r_{13}/r_{22} \qquad (6)$$

Equation (6) shows that TE phase shift nulling (i.e. preferential TM phase modulation) can be achieved through the design of the electrode parameters $L_v$, $L_h$, $g_v$ and $g_h$. Further resistive balancing of the exact voltage applied to each of the electrode sets 21 and 23 could be used to optimize the phase shift suppression of the TE mode. This may be required due to secondary or stray field effects which are not accounted for in the above analysis, or to compensate for tolerances in the fabrication of the phase modulator of FIG. 1.

In theory, polarization selective operation could be achieved by using only the electrode set 21 to modulate only the TE mode. However, the modulation efficiency for this configuration is determined by the electro-optic coefficient $r_{22}$, which is the weakest coefficient (approximately 20% of $r_{33}$) for this substrate orientation. Furthermore, polarization selective operation in this case would require the electrode field generated by the electrode set 21 to be perfectly horizontal through the region of the channel waveguide 13. In practice this is not achievable, and significant TM modulation would arise due to stray field components.

In the phase modulator of FIG. 1, TE phase modulation due to the electrode set 21 is canceled out by the electrode set 23 substantially leaving only the TM modulation (equation 4) due to the stronger $r_{33}$ electro-optic coefficient. Consequently, optimum modulation efficiency is achieved for the TM mode, while the response of the TE mode is nulled.

Therefore, what has been described is a polarization-selective, integrated-optic phase modulator suitable for use in coherent communications, optical signal processing, and fiber and waveguide sensor systems. In operation, X-directed input polarized light propagates through a channel waveguide in a Z-cut $LiNbO_3$ substrate. Two sets of electrodes, which are disposed in proximity to first and second portions of the channel waveguide, allow horizontal and vertical electric fields to be applied in the first and second portions of the channel waveguide. These electric fields selectively act on the TE and TM modes of the input polarized light to substantially phase modulate only the TM mode of that light.

It should therefore readily be understood that many modifications and variations of the present invention are possible within the purview of the claimed invention. For example, the concept of the polarization-selective phase modulator of the invention could also be utilized in other applications, such as in polarization-selective interferometic modulators and switches in $LiNbO_3$ or other suitable electro-optical materials. It is therefore to be understood that within the scope of the appended claims, the invention may be practical otherwise than as specifically described.

What is claimed and desired to be secured by Letters Patent of the U.S. is:

1. An integrated-optic, polarization-selective phase modulator comprising:
   a unitary substrate;
   a channel waveguide extending longitudinally along said unitary substrate for providing a path therethrough for polarized light having first and second polarization components; and
   first and second configurations of electrodes respectively disposed in proximity to first and second portions of said channel waveguide;
   said first and second configurations of electrodes being responsive to the applications of a control voltage to each of said first and second configurations for operating on each of said first and second polarization components differently so that substantially only one of the first and second polarization components of the polarized light is phase modulated by the application of said control voltage thereto.

2. The polarization-selective phase modulator of claim 1 wherein:
   said first configuration of electrodes is responsive to the application of said first control voltage for substantially providing a horizontal electric field in said first portion of said channel waveguide; and
   said second configuration of electrodes is responsive to the application of said control voltage for substantially providing a vertical electric field in said second portion of said channel waveguide.

3. The polarization-selective phase modulator of claim 1 wherein:
   said first configuration of electrodes includes a first and second electrodes respectively disposed on opposite sides of said first portion of said channel waveguide, said first and second electrodes being responsive to the application of said control voltage therebetween for substantially providing a horizontal electric field in said first portion of said channel waveguide; and
   said second configuration of electrodes includes a third electrode disposed over said second portion of said channel waveguide and fourth and fifth electrodes electrically connected together and being respectively disposed on opposite sides of said second portion of said channel waveguide, said third, fourth and fifth electrodes being responsive to the application of said control voltage between said third and fourth electrodes for substantially providing a vertical electric field in said second portion of said channel waveguide.

4. An integrated-optic, polarization-selective phase modulator comprising:
   a unitary substrate;
   a channel waveguide formed in said unitary substrate for providing a path therethrough for polarized light having horizontal and vertical polarization components; and
   an electrode structure disposed above said channel waveguide and being responsive to the application of a control voltage to said electrode structure for operating on each of said horizontal and vertical polarization components differently in order to substantially phase modulate only the vertical polarization component of said polarized light.

5. The polarization-selective phase modulator of claim 4 wherein:
   said substrate is a $LiNbO_3$ substrate.

6. The polarization-selective phase modulator of claim 4 wherein said electrode structure includes:
   first and second sets of electrodes respectively disposed in proximity to first and second portions of said channel waveguide and being responsive to the application of said control voltage to each of said sets for substantially causing horizontal and vertical electric fields to be respectively applied in said first and second portions of said channel waveguide, said horizontal and vertical electric fields selectively acting on said polarized light to substantially phase modulate only the vertical polarization component of said polarized light.

7. The polarization-selective phase modulator of claim 6 wherein:

said first set of electrodes includes first and second electrodes respectively disposed on opposite sides of said first portion of said channel waveguide, said first and second electrodes being responsive to the application of said control voltage therebetween for substantially providing said horizontal electric field in said first portion of said channel waveguide; and said second set of electrodes includes a third electrode disposed over said second portion of said channel waveguide and fourth and fifth electrodes commonly-connected together and being respectively disposed on opposite sides of said second portion of said channel waveguide, said third and said commonly-connected fourth and fifth electrodes being responsive to the application of said control voltage between said third electrode and said commonly-connected fourth and fifth electrodes for substantially providing said vertical electric field in said second portion of said channel waveguide.

8. The polarization-selective phase modulator of claim 7 wherein:

said first and second electrodes are each of a first preselected length, and are separated from each other by a first preselected electrode gap; and said third, fourth and fifth electrodes are each of a second preselected length, and each of said fourth and fifth electrodes is separated from said third electrode by a second preselected electrode gap.

9. The polarization-selective phase modulator of claim 8 wherein:

said substrate is a $LiNbO_3$ substrate.

* * * * *